May 5, 1959  M. E. PRIEM  2,884,849
GRILL
Filed Sept. 20, 1957
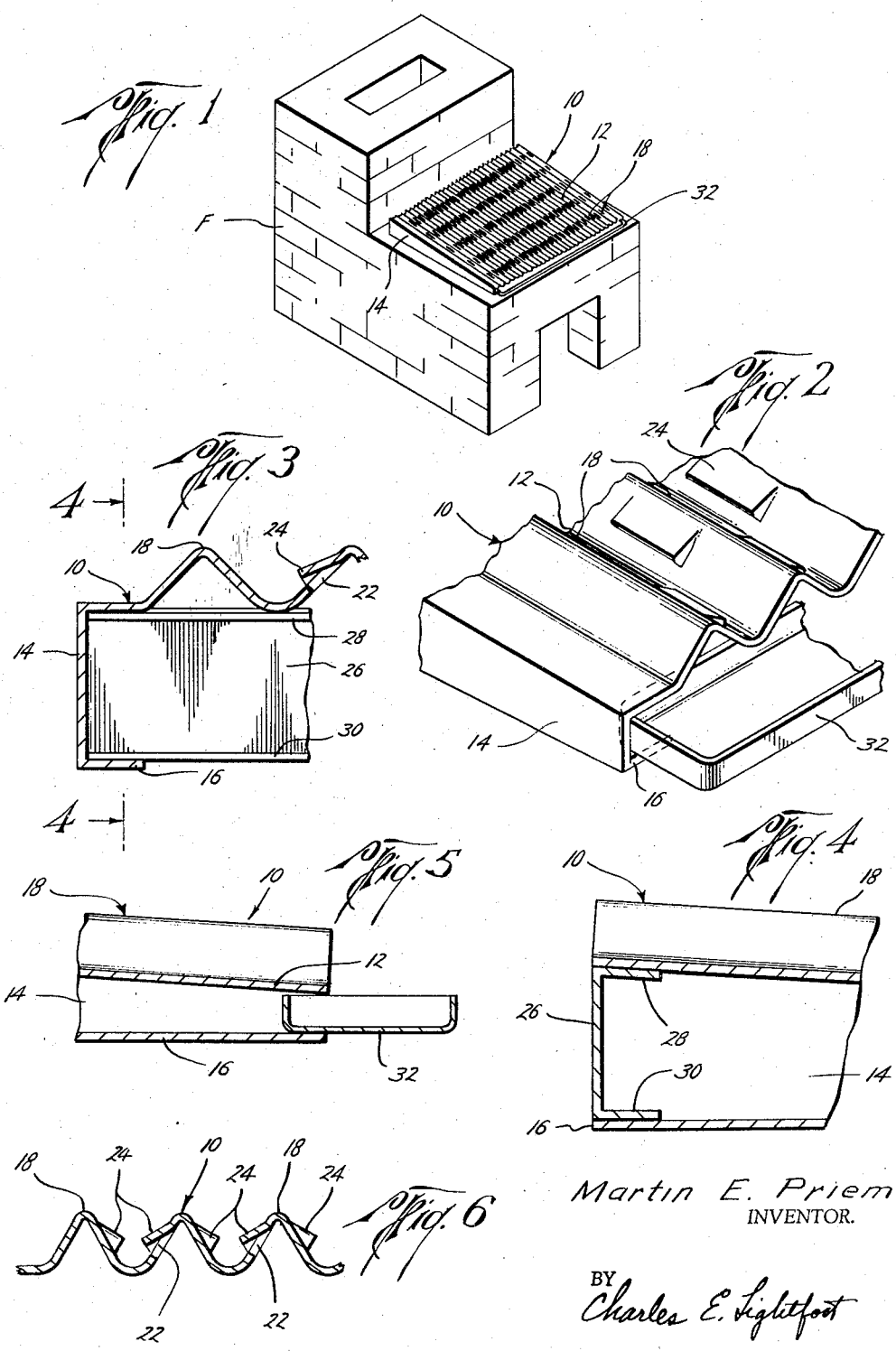
Martin E. Priem
INVENTOR.
BY Charles E. Lightfoot
ATTORNEY

United States Patent Office 2,884,849
Patented May 5, 1959

2,884,849

GRILL

Martin E. Priem, Houston, Tex.

Application September 20, 1957, Serial No. 685,111

3 Claims. (Cl. 99—444)

This invention relates to a grill and more particularly to a device for supporting food above a fire in position to be cooked thereby while being subjected to the smoke from the fire.

The invention finds particular application in connection with the roasting and broiling of meat to which it is desired to impart a smoky flavor while at the same time conserving the juices of the meat and preventing the same from falling into the fire. In the broiling or barbecuing of meat, the meat is supported over a fire on a grill or by means which permits the turning of the meat as it is cooked so that the meat is roasted and subjected to the smoke of the fire to impart to it a smoky flavor. Cooking apparatus of this sort, as heretofore commonly employed, possesses the disadvantage that the fat and juices from the meat fall into the fire causing the same to flame up and burn the meat or subjecting the same to the acrid smoke of the burning fat which imparts an undesirable burnt taste to the meat.

Various attempts have been made, heretofore, to eliminate the above difficulty by interposing some means between the fire and the meat to prevent the fat and juices from reaching the fire while at the same time permitting the smoke to reach the meat. Such devices, as heretofore commonly constructed, however, have been unsatisfactory in that they interfere with the combined action of the heat and flavoring of the meat to the desired extent.

The present invention has for an important object the provision of a grill or support for food to be cooked whereby the food may be subjected to the combined action of heat and smoke without danger of fat and juices from the food falling into the fire.

Another object of the invention is to provide a grill which is constructed to support meat above a fire in position to be heated and subjected to smoke from the fire and to conduct away the fat and juices of the meat to prevent the burning of the same.

A further object of the invention is the provision of a grill constructed to support food to be cooked above a fire and having means for conducting away fat and juices from the food and for retaining the same at a location away from the heat of the fire.

Another object of the invention is to provide a grill of the character mentioned which is formed of sheet metal and having corrugations or grooves formed therein in position to conduct away fat and juices from the food and also having openings located to permit the passage of smoke from the fire into contact with the food while at the same time preventing the escape of fat and juices from the food into the fire.

A further object of the invention is the provision of a grill formed of sheet metal having corrugations or grooves therein and having a removable trough-shaped container positioned to receive fat and juices conducted away from the food by the grooves and which also serves as a brace or rigidifying element of the grill.

The above and other important objects and advantages of the invention may best be understood from the following detailed description, constituting a specification of the same when considered in conjunction with the annexed drawings, wherein:

Figure 1 is a perspective view on a reduced scale, illustrating the invention and showing the manner in which the same is used in connection with an outdoor fireplace or other similar heat source;

Figure 2 is a fragmentary perspective view on an enlarged scale showing details of structure of the grill of the invention and the receptacle or tray forming a part thereof;

Figure 3 is a fragmentary transverse cross-sectional view, on an enlarged scale, showing structural details of the grill of the invention and the bracing or rigidifying member forming a part thereof;

Figure 4 is a fragmentary, longitudinal cross-sectional view on an enlarged scale, showing structural details of the grill and bracing or rigidifying member and the manner in which the same are assembled;

Figure 5 is a fragmentary, longitudinal, cross-sectional view, on an enlarged scale, showing structural details of the lower end of the grill and the receptacle or tray forming a part of the invention; and Figure 6 is a fragmentary, transverse, cross-sectional view, on an enlarged scale, of the main portion of the grill, showing the configuration of the corrugations forming the grooves of the grill and the structure of the openings provided therein.

Referring now to the drawings in greater detail the grill of the invention comprises a body 10 formed of sheet metal having a main portion 12 of substantially rectangular configuration and side portions 14 which are downturned and whose lower marginal portions 16 are inturned throughout the length of the body. The downturned portions 14 and inturned portions 16 form with the main body portion 12 channels extending along the opposite sides of the body and which open toward each other beneath the main portion 12. The down-turned side portions 14 are of greater width at one end than at the other, so that when the grill is resting upon a horizontally disposed support on the inturned portions 16, the main portion 12 will be in a sloping position from one end of the body toward the other end thereof.

The main portion 12 is formed with longitudinally extending corrugations 18 providing upwardly opening grooves or troughs which are open longitudinally at their ends, so that fat, juices and the like will be conducted away from meat or other food which rests upon the main portion during the cooking operation.

Openings 22 are provided in the side walls of the grooves above the bottoms of the grooves through which smoke may pass upwardly from the fire beneath the grill to contact the food being cooked to impart a smoky flavor to the same. These openings 22 preferably take the form of elongated slits extending longitudinally of the grooves which are formed by slitting the metal and pressing the metal inwardly of the side walls of the groove above the slits to form downwardly and inwardly extending portions 24 on opposite sides of the grooves down which the juices may run into the bottoms of the grooves without passing through the openings. The sloping portions or hoods 24 are located to prevent the passage of the fat, juices or the like, from the food through the openings 22 while at the same time permitting the upward movement of smoke from the fire through the openings into contact with the food.

At the end of the body at which the width of the side portions 14 is greatest a stiffening or rigidifying element 26 is positioned beneath the main portion 12 extending at its opposite ends into the side channels of the body. This stiffening element may conveniently take the form of a channel member positioned with one flange 28 thereof in contact with the lower surface of the main portion 12 and the other flange 30 thereof in contact at its opposite end portions with the inturned portions 16 of the side channels of the body to stiffen and rigidify the main portion along one end of the body.

An elongated trough-like receptacle or tray 32 is positioned between the side channels of the body with its ends extending into the side channels at the ends thereof at which the down-turned portions 14 are of least width. The receptacle 32 is preferably of a depth to fit into the side channels of the body with the upper edge of the receptacle along one side thereof in contact with the lower surface of the main portion 12, so that the receptacle forms a stiffener along one end of the body, the receptacle being open at the top and positioned to receive fat, juice or the like from the lower ends of the grooves when the grill is in position over a fire. The receptacle 32 and the stiffener element 26 may be made removable to permit the parts of the grill to be easily cleaned.

In making use of the grill of the invention the body is assembled with the stiffener element 26 by inserting this element beneath the main portion 12 with its ends extending into the side channels of the body and the receptacle 32 is inserted beneath the main portion with its ends extending into the side channels and one side edge of the receptacle positioned outwardly beyond the lower ends of the grooves of the body. The grill is then placed on any convenient horizontal support above a fire, such as upon the outdoor fireplace F, shown in Figure 1, with the inturned portions 16 resting on the support so that the main portion slopes downwardly toward the receptacle. With the grill thus positioned over the fire, the food to be cooked, such as meat, is placed on the grill in contact with the corrugations thereof. The food will then be in position to be cooked by the heat of the fire and smoke from the fire may pass upwardly through the openings 22 into contact with the food to flavor the same. Any fat, juice or the like from the food may then flow into the grooves and downwardly therealong into the receptacle 32 from which it may be used to baste the food or allowed to accumulate for other purposes. Any fat, juice or the like from the food is prevented by the hoods 24 from passing out through the openings 22 and falling into the fire.

When it is desired to clean the grill, the stiffener element 26 and tray 32 may be removed to permit the parts to be easily washed and scrubbed.

It will thus be seen that the invention constructed and arranged and described above provides a grill of simple design and rugged construction, which is easily assembled or disassembled and by the use of which the juices of the food being cooked are saved, while at the same time smoke from the fire may readily reach the food to impart flavor thereto.

While the invention is disclosed herein in connection with a certain specific embodiment of the same it will be understood that this is intended by way of illustration only, and that various changes can be made in the construction and arrangement of the parts within the spirit of the invention and the scope of the appended claims.

Having thus clearly shown and described the invention, what is claimed as new and desired to secure by Letters Patent is:

1. A grill for cooking food comprising a body of generally rectangular configuration formed of sheet material having a main portion formed with longitudinally extending corrugations providing upwardly opening grooves and with down-turned sides whose lower marginal portions are in-turned to form with said main portion inwardly opening channels, said sides being of greater height at one end of the body than at the other end thereof so that the main portion will be disposed in a sloping position from end to end when the body is supported with said in-turned portions resting on a horizontally positioned support, said grooves being open at their lower ends to permit liquid to flow off of said main portion along the grooves when the body is so supported, said main portion having openings in the sides of said grooves above the bottoms of the grooves and a liquid receiving and rigidifying member removably supported in said channels and extending beyond the lower ends of said grooves in position to receive liquid from the grooves; said member having a portion positioned for engagement with said corrugations beneath the bottoms of said grooves along the lower end of said main portion to hold the same against flexing.

2. A grill for cooking food comprising a body of generally rectangular configuration formed of sheet material having a main portion formed with longitudinally extending corrugations providing upwardly opening grooves and with down-turned sides whose lower marginal portions are in-turned to form with said main portion inwardly opening channels, said sides being of greater height at one end of the body than at the other end thereof so that the main portion will be disposed in a sloping position from end to end when the body is supported with said in-turned portions resting on a horizontally positioned support, said grooves being open at their lower ends to permit liquid to flow off of said main portion along the grooves when the body is so supported, said main portion having openings in the sides of said grooves above the bottoms of the grooves and a tray-like receptacle and rigidifying member removably extended across the lower end of the body beneath said main portion and beyond the open ends of said grooves in position to receive liquid from the grooves and whose opposite ends extend into said channels, said member having a wall portion positioned for engagement with said corrugations along the lower margin of said main portion to hold the same against flexing.

3. A grill for cooking food comprising a body of generally rectangular configuration formed of sheet material having a main portion formed with longitudinally extending corrugations providing upwardly opening grooves and with down-turned sides whose lower marginal portions are in-turned to form with said main portion inwardly opening channels, said sides being of greater height at one end of the body than at the other end thereof so that the main portion will be disposed in a sloping position from end to end when the body is supported with said in-turned portions resting on a horizontally positioned support, said grooves being open at their lower ends to permit liquid to flow off of said main portion along the grooves when the body is so supported, said main portion having openings in the sides of said grooves above the bottoms of the grooves and a tray-like rigidifying element removably supported on the body extending across the lower end of the body beneath said main portion and beyond the open ends of the grooves in position to receive liquid from the grooves and having a side wall portion positioned for engagement with said corrugations to hold said main body portion against flexing.

References Cited in the file of this patent

UNITED STATES PATENTS

| | | |
|---|---|---|
| 215,711 | Adams | May 27, 1879 |
| 1,007,323 | Betts | Oct. 31, 1911 |
| 1,862,420 | O'Brien | June 7, 1932 |